US008189095B2

(12) United States Patent
Gerwe

(10) Patent No.: US 8,189,095 B2
(45) Date of Patent: May 29, 2012

(54) METHOD AND APPARATUS FOR SUPERRESOLUTION IMAGING

(75) Inventor: David R. Gerwe, Woodland Hills, CA (US)

(73) Assignee: The Boeing Company, Chicago, IL (US)

( * ) Notice: Subject to any disclaimer, the term of this patent is extended or adjusted under 35 U.S.C. 154(b) by 575 days.

(21) Appl. No.: 12/261,196

(22) Filed: Oct. 30, 2008

(65) Prior Publication Data

US 2010/0110208 A1 May 6, 2010

(51) Int. Cl.
*H04N 5/222* (2006.01)
(52) U.S. Cl. ........................................................ 348/370
(58) Field of Classification Search ............... 348/222.1, 348/370; 382/299
See application file for complete search history.

(56) References Cited

U.S. PATENT DOCUMENTS

| 4,856,884 | A | * | 8/1989 | Fender et al. | 359/419 |
| 5,093,563 | A | * | 3/1992 | Small et al. | 250/201.9 |
| 6,313,908 | B1 | * | 11/2001 | McGill et al. | 356/28.5 |
| 7,444,032 | B2 | * | 10/2008 | Larkin et al. | 382/248 |
| 2006/0154156 | A1 | * | 7/2006 | Farah | 430/5 |

OTHER PUBLICATIONS

P. J. Sementilli, B. R. Hunt, and M. S. Nadar, "*Analysis of the limit to superresolution in incoherent imaging*," 10(11), 2265-2276 (1993).
B. Cambell, L. Rubin, and R. Holmes, "Experimental demonstration of synthetic aperture imaging through an aberrating medium," Appl. Opt. 34(26) 5932-5937 (1995).
T. R. M. Sales and G. M. Morris, "Diffractive superresolution elements," *Opt. Lett.* 14(7)1637-1646 (1997).
D. R. Gerwe and M. A. Plonus, "Superrresolved image reconstruction of images taken through the turbulent atmosphere," *J. Opt. Soc. Amer. A* 15(10) 2620-2628 (1998).
R. B. Holmes, and T. Brinkley, "Reconstruction of images of deep space objects using Fourier Telescopy," *Proc. SPIE* 3815, (1999).
T. J. Brinkley, and D. Sandler, "Effect of atmospheric turbulence and jitter on Fourier Telescopy imaging systems," *Proc. SPIE* 3815, (1999).
K. Bush and C. Barnard, "Wavelength-dependent radiometric modeling for an active geosynchronous satellite imaging system," Proc. SPIE 4091 333-344 (2000).
T. Karr, "Resolution of synthetic-aperture imaging through turbulence," *J. Opt. Soc. Amer. A* 20(6) 1067-1082 (2003).
J. J. Dolne and P. S. Idell, "Optical synthetic aperture radar imaging and phase-error compensation," Proc. SPIE 5552 200-207 (2004).

(Continued)

*Primary Examiner* — Lin Ye
*Assistant Examiner* — Amy Hsu
(74) *Attorney, Agent, or Firm* — Alston & Bird LLP

(57) ABSTRACT

An apparatus and method are disclosed for providing superresolution imaging of a target, including remote targets. An apparatus for superresolution imaging may include a receiver having a predefined receiving aperture for capturing an image of the target. The apparatus may also include a plurality of transmitters spaced apart from one another and configured to concurrently emit signals with a phase difference therebetween. The plurality of transmitters may be further configured to emit overlapping beams onto the target to produce a fringe pattern modulated at spatial frequencies beyond the resolution limit of the receiving aperture. The apparatus may further include a processor configured to process the image including at least a portion of the fringe pattern in order to produce a superresolved image including spatial frequency content beyond the resolution limit of the receiving aperture. A corresponding method may also be provided.

20 Claims, 4 Drawing Sheets

OTHER PUBLICATIONS

B. J. Davis, W. C. Karl, et al, "Capabilities and limitations of pupil-plane filters for superresolution and image enhancement," *Opt. Exp.* 12(17), 4150-4156 (2004).

S. M. Beck, J. R. Buck, W. F. Buell, et al, Synthetic-aperture imaging laser radar: laboratory demonstration and signal processing, *Appl. Opt.* 44(35) 7621-7629 (2005).

C. L. Matson, "Primary and secondary superresolution by data inversion," Opt. Exp. 14(2), 456-473 (2006).

Eyal Ben-Eliezer and Emanuel Marom, "Aberration-free super-resolution imaging via binary speckle pattern encoding and processing," *J. Opt. Soc. Amer. A* 24(4), 1003-1010 (2007).

E. Barrett, D. W. Tyler, P. M. Payton, K. Ip, D. N. Christie, "New approaches to image super-resolution beyond the diffraction limit," *Proc. SPIE* 6712, D1-D14 (2007).

D. Tyler, E. B. Barrett, "Simulation of a passive-grating heterodyning superresolution concept," *Proc. SPIE* 7094 (2008).

S. A. Shroff, J. Fienup and D. R. Williams, "OTF compensation in structured illumination superrresolution images," Proc. SPIE 7094 (2008).

T.R.M.Salas, G. Michael Morris, "Fundamental limits of optical superresolution", Optics Letters, vol. 22, No. 9, pp. 582-584.

* cited by examiner

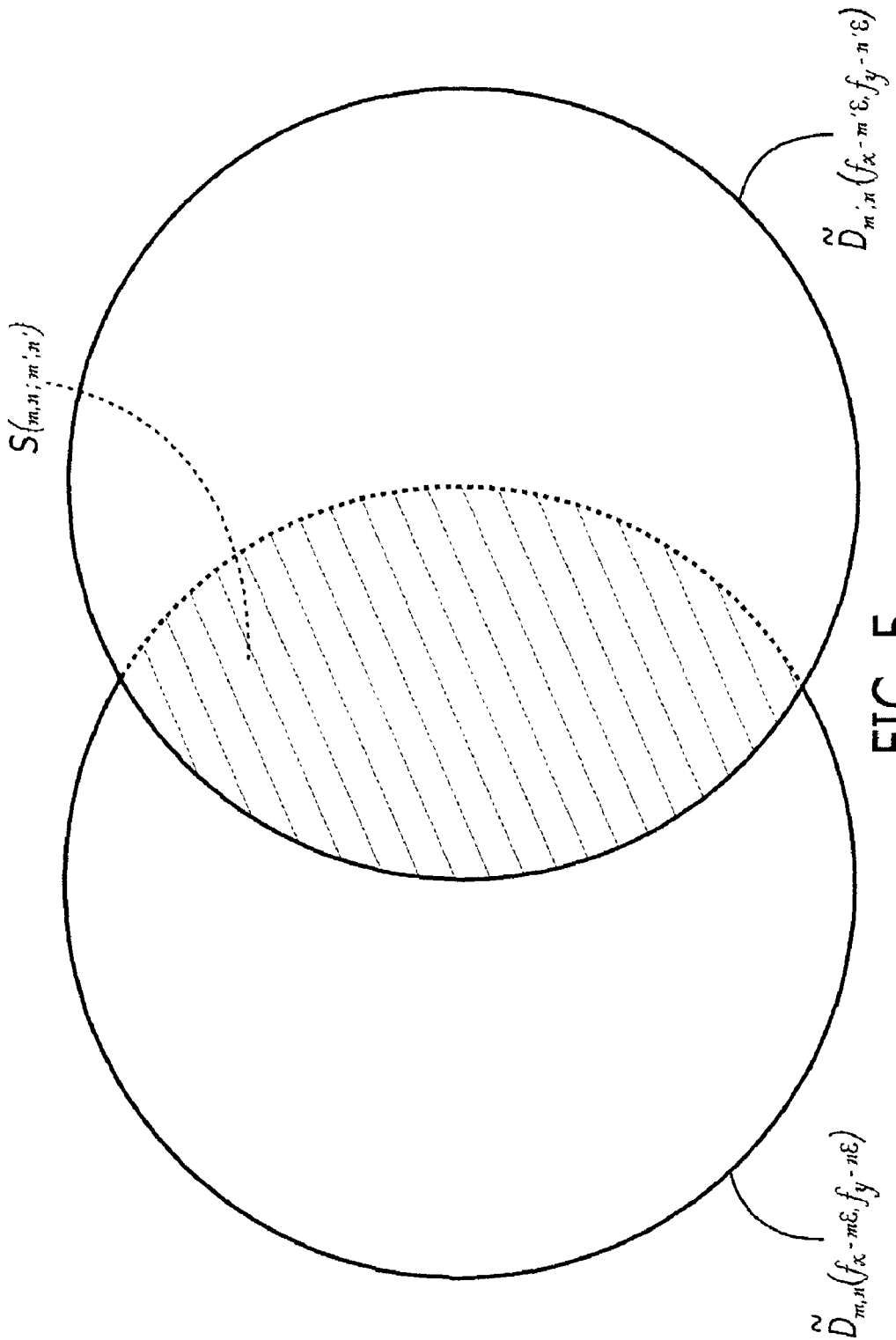

METHOD AND APPARATUS FOR SUPERRESOLUTION IMAGING

BACKGROUND OF THE INVENTION

1. Field of the Invention

Embodiments of the present invention relate generally to imaging and, more particularly, relate to methods and apparatus for superresolution imaging of a target.

2. Description of Related Art

The achievable resolution of a conventional telescope system is fundamentally limited by optical diffraction such that the size of the smallest resolvable features is approximately: $r_{diff}=(\lambda\ Z)/D$ wherein $\lambda$ is the optical wavelength; $Z$ is the distance to the object and $D$ is the collection aperture width. For non-circular telescope apertures, it is noted that resolution will be direction dependent with the resolution associated with a particular transverse direction being inversely proportional to the width of the aperture in the associated direction (where the optical system has been "unfolded" such that the optical beam has no twists or turns). For example, for a rectangular aperture of width $D_x$ and height $D_y$, the diffraction limited resolution of the image in the horizontal and vertical directions will be, respectively, $(\lambda\ Z)/D_y$ and $(\lambda\ Z)/D_y$.

Although improved resolution is desired in some applications, better resolution requires generally larger aperture sizes. However, the design time and difficulty, fabrication time and difficulty, weight and cost of a telescope system increase rapidly and nonlinearly with size. As such, superresolution techniques that improve resolution while circumventing the diffraction limit are of interest to reduce the high cost of high resolution telescope systems and to reduce the size and weight needed to achieve a desired performance. Such superresolution techniques would ideally be able to resolve and discriminate features many times finer than the diffraction limit associated with the width of the physical receiving aperture.

One superresolution technique is based on mathematical techniques to implicitly or explicitly estimate spatial frequency content beyond the hard cutoff frequency corresponding to the highest frequency of the passband associated with the diffraction limit. This estimation is enabled through use of various physical constraints on the intensity properties of objects such as finite extent positivity and/or by statistical knowledge of the object's spatial intensity distribution function (e.g., it is composed of homogenous segments with sharp contrast transitions). By restoring lost frequencies beyond the passband, fine-scale details are restored. Although these techniques have been pursued for some time, these techniques have not been shown to extend resolution beyond the diffraction limit by more than ~5-20%.

Other superresolution techniques include superresolution by aperture coding and superresolution by image sharpening which are accomplished by two distinct methods, but which have the same effect. In particular, aperture coding modulates the transmission amplitude and/or phase of the coherent transfer function of the telescope system, while image sharpening uses linear or non-linear post-processing methods to digitally amplify high frequency Fourier components of the image. However, both techniques act to adjust the shape of the blur function by making the center lobe sharper at the price of placing more energy in the higher order diffractive lobes.

Optical synthetic aperture radar (OSAR) is the optical analog to lower wavelength electromagnetic radiation (e.g., radio and microwave radiation) synthetic aperture radar (SAR) systems. OSAR achieves spatial resolution through temporally modulated active illumination, and accurate temporally resolved measurement of the amplitude and phase of reflected radiation pulses, while the relative motion between the imaging system and target causes the imaging system to sweep out an arc in relation to the target referred to as the synthetic aperture. The synthetic aperture angle may correspond to the angular rotation of a spinning object during the image collection time, or the angle subtended by relative translational motion of the image system with respect to the object, or a combination thereof. The imaging system operates by transmitting sequences of laser pulses at the object, collecting the reflected returns with a receiver aperture, optically mixing (e.g., via a heterodyne) the received light with a local optical beam that is coherent with the transmitted beam, focusing all of the mixed light onto a heterodyne detector which measures the temporal varying amplitude and phase of the total received signal, and computationally processing the signal (analog, digital, or hybrid) to form the image. The x-y dimensions of an OSAR image correspond to the angle and range of the target relative to the image system, rather than the angle-angle produced by conventional passive systems. The range resolution of an OSAR system is related to the spectral bandwidth of the pulses which are of either short duration or are frequency modulated (i.e., chirped). The angle resolution of the OSAR image is limited by the diffraction limit of the synthetic aperture, e.g., by the angular extent of the arc swept out by the relative motion. Thus, the resolution is disassociated with the physical width of the collection aperture and, as a result, circumvents the normal diffraction limit associated with the physical aperture of the receiver. However, a challenge of OSAR is the requirements for long coherence length sources, and accurate control and/or knowledge of the phase relations between the pulses.

Also, a single OSAR image has a signal to noise ratio (SNR) of 1 as a result of laser speckle noise. Many images must be produced and averaged to produce a higher SNR image. OSAR is also extremely sensitive to vibrations or any movement at optical scales within the field of view (FOV) (e.g., motion of foliage from wind, vibrating surfaces, moving car/person, etc.). Because the x and y axes of an OSAR image are angle and range, image appearance is significantly different from conventional imaging systems for which the image x and y axes correspond to horizontal and vertical angles just like direct human vision and conventional telescopes produce. Furthermore, perception of the image is complicated since the image is tomographic in nature such that multiple points on the object (i.e., points lying along a line in the projection direction) are mapped to a single point in the image, e.g., the signal in an image pixel can correspond to points on the front and back surface of an object. As a result of these complexities, interpretation of SAR-type imagery often requires special training.

Fourier telescopy uses similar principles to OSAR. Fourier telescopy uses an array of transmitters and a single non-imaging (e.g., bucket) collector, that measures only the temporal intensity variations of the reflected signal, but not the phase. The basic principle of Fourier telescopy is to illuminate the object with pairs of transmitters powered by a common laser source so the light is highly spatially coherent between the transmitters such that the beams interfere strongly at the target to produce a sinusoidal fringe pattern. Adjusting the phase of one of the transmitters with respect to the other causes the fringe pattern to slide across the target. Measurement of the return provides direct measurement of the in-phase and quadrature parts of a Fourier component of the object's spatial reflectivity distribution. Repeating for various pairings of transmitters produces fringe patterns of different orientation and spatial period, allowing the Fourier transform of the object's reflectivity distribution to be sampled at many points within some footprint in the Fourier domain. In the simplest configuration, the transmitters are equally spaced to form an "L" pattern so all possible pairings corresponds to a regularly spaced rectilinear grid of samples of the Fourier transform of the object's reflectivity function. In this case, the spatial domain image is directly produced by inverse Fourier transforming. Additional complexities involve illumination with 3 transmitters simultaneously and amplitude modulation coding which allows the relative phases between the Fourier components to be measured in a way that is insensitive to spatial modulation of the wavefront phase by atmospheric turbulence (referred to as the phase-closure approach). The diffraction limited resolution of the Fourier telescopy system is related to the effective aperture size corresponding to the width of the transmitter array in each direction. The field-of-view (FOV) is inversely proportional to the smallest separation between transmitter elements, and thus the number of resolution elements of the produced image in the vertical and horizontal directions is equal to the number of transmitter elements in the corresponding directions.

However, the vertical (or horizontal) angular FOV of the image is equal to 2 times the wavelength divided by the spacing of the transmitters in the vertical (or horizontal) direction. Since the angular resolution of the image is equal to the wavelength divided by the longest baseline of the transmitter array, an "L"-shaped array with 10 transmitters on each leg would only form an image of 20×20 resolution elements. A larger image can be built up from a patchwork of several small ones. However, the avoidance of aliasing problems requires that the laser illumination beam not illuminate an area larger than the FOV associated with the transmitter spacing. This limitation implies that the transmitter apertures should be of width equal to their spacing in order to adequately focus the beam such that the majority of the energy lies within the FOV. For ground-to-space imaging of satellites and space objects, this issue goes away if the extent of the object is smaller than the FOV since there is no background to the object to reflect light. Additionally, a single image has a SNR of 1 as result of laser speckle noise. Many images must be produced and averaged to produce a higher SNR image.

Another type of superresolution technique is to capture a set of conventional images (e.g., using a normal telescope and detector) with the object illuminated by a set of modulation patterns with spatial variations at scales significantly smaller than the diffraction limit of the telescope. See Eyal Ben-Eliezer and Emmanuel Marom, "Aberration-free superresolution imaging via binary speckle pattern encoding and processing," *J. Opt. Soc. Amer. A* 24(4), 1003-1010 (2007) (hereinafter the "Ben-Eliezer article"); E. Barrett, D. W. Tyler, P. M. Payton, K. Ip, D. N. Christie, "New approaches to image super-resolution beyond the diffraction limit," *Proc. SPIE* 6712, D1-D14 (2007) (hereinafter the "Barrett article"); D. Tyler, E. B. Barrett, "Simulation of a passive-grating heterodyning superresolution concept," *Proc. SPIE* 7094 (2008) (hereinafter the "Tyler article"); and S. A. Shroff, J. Fienup and D. R. Williams, "OTF compensation in structured illumination superresolution images," *Proc. SPIE* 7094 (2008) (hereinafter the "Shroff article"). As described in the Barrett article, high-frequency spatial content (e.g., fine scale features) of the object beyond the diffraction limited resolution cutoff will be aliased down into the pass-band of the optical system. By projecting a set of illumination patterns with spatial fluctuations of scales and orientations that densely cover a region in Fourier space M-times larger than the diffraction limited region, they comprise all information needed to generate an M-times higher resolution image. Many possible choices exist for the set of illumination patterns and for methods of combining the signals in this constituent image set to produce a final single high-resolution image. The Ben-Eliezer article uses a random set of illumination patterns, and forms the superresolved image by computing and algebraically combining various averages involving simple algebraic combinations (e.g., products, divisions, and subtractions) of the images. The Barrett and Tyler articles describe a deliberately chosen set of illumination patterns corresponding to sinusoids with a linear progression of two-dimensional (2D) sinusoid spatial frequency in the horizontal and vertical directions, followed by a direct least-squares combination to undo the alias-coded information and produce a single restored super-resolved image. The Shroff article describes a similar method, but the progression of sinusoids rotates through several angles.

Although the Ben-Eliezer and Barrett articles describe the reconstruction of superresolved images from experimental data, the experiments described by both articles require the placement of spatially modulated transparency masks in close proximity to the back-illuminated object to be imaged. In some applications, such as remote sensing applications, such spatially modulated transparency masks cannot be placed in close proximity to the object to be imaged. As such, improved techniques for capturing superresolved images, including superresolved images of remote targets, would be desirable.

BRIEF SUMMARY OF THE INVENTION

An apparatus and method are therefore provided according to embodiments of the present invention for providing super-resolution imaging of a target, including remote targets that are not amenable to having spatially modulated transparency masks placed in close proximity thereto. As such, the apparatus and method of embodiments of the present invention can be advantageously employed in a variety of applications, including remote sensing applications.

According to one embodiment, an apparatus for superresolution imaging of a target includes a receiver having a predefined receiving aperture for capturing an image of the target. The apparatus of this embodiment also includes a plurality of transmitters spaced apart from one another and configured to concurrently emit signals with a phase difference therebetween. The plurality of transmitters are further configured to emit overlapping beams onto the target to produce a fringe pattern modulated at spatial frequencies beyond the resolution limit of the receiving aperture. Although the receiver and the plurality of transmitters may be proximate one another, the receiver and the transmitters of one embodiment are remote from the target, thereby facilitating remote sensing applications. The apparatus may further include a processor configured to process the image including at least a portion of the fringe pattern in order to produce a superresolved image including spatial frequency content beyond the resolution limit of the receiving aperture. The apparatus of one embodiment may also include a common source for providing signals to the plurality of transmitters.

The plurality of transmitters may be configured such that a first group of two or more transmitters concurrently emits signals at a first time and a second group of two or more transmitters, different than the first group, concurrently emits signals at a second time. In this embodiment, the processor may be configured to produce the superresolved image based upon the images created by each group of transmitters. In this regard, for each group of transmitters, the processor may be configured to determine a contribution to the superresolved image based upon the image created by the respective group of transmitters and to determine a location of the contribution to the superresolved image based upon a position of the transmitters which comprise the respective group.

According to another embodiment, a method for superresolution imaging of a target is provided that concurrently emits signals from a plurality of transmitters spaced apart from one another. In this regard, the signals that are concurrently emitted from different transmitters have a phase difference therebetween, even though the signals may originate with a common source. Moreover, the signals that are concurrently emitted form overlapping beams on the target to produce a fringe pattern modulated at spatial frequencies beyond the resolution limit of the receiving aperture. An image of the target is then captured with a receiver having the predefined receiving aperture. Additionally, the image including a portion of the fringe pattern is then processed to produce a superresolved image including spatial frequency content beyond the resolution limit of the receiving aperture.

The concurrent emission of signals may include the concurrent emission of signals at a first time from a first group of two or more transmitters and the concurrent emission of signals at a second time from a second group of two or more transmitters, different than the first group. In this regard, the superresolved image may be produced based upon the images created by each group of transmitters. For each group of transmitters, a contribution to the superresolved image may be determined based upon the image created by the respective group of transmitters and the location of the contribution to the superresolved image may be determined based upon the position of the transmitters which form the respective group.

In one embodiment, an apparatus for the superresolution imaging of the target includes a telescope having a predefined receiving aperture for capturing an image of the target. The apparatus of this embodiment may also include an array of transmitters spaced apart from one another in first and second orthogonal directions. In one embodiment, the array of transmitters includes a first plurality of transmitters extending in the first direction and a second plurality of transmitters extending in the second direction. At least some of the transmitters may be spaced such that adjacent transmitters are spaced apart by no more than $(D\sqrt{2})$. Different pairs of transmitters are configured to emit signals with a phase difference therebetween to produce a fringe pattern upon the target that is modulated at spatial frequencies beyond the resolution limit of the receiving aperture. The apparatus of this embodiment also includes a processor configured to process the images including at least a portion of the fringe patterns created by different pairs of transmitters in order to produce a superresolved image including spatial frequency content beyond the resolution limit of the receiving aperture.

In one embodiment, the apparatus also includes a common source for providing signals to the plurality of transmitters. The common source may have a coherence length that is at least as great as the greater of the widths of the array of transmitters in the first and second directions. Additionally, the apparatus of this embodiment may include a phase modulator for introducing a predefined phase shift to the signals provided by the common source to one transmitter of a pair of transmitters.

The array of transmitters may be configured such that a first pair of transmitters concurrently emits signals at a first time and second pair of transmitters, different than the first pair, concurrently emits signals at a second time. In this embodiment, the processor may be configured to produce the superresolved image based upon the images created by each pair of transmitters. For example, for each pair of transmitters, the processor may be configured to determine a contribution to the superresolved image based upon the image created by the respective pair of transmitters and to also determine a location of the contribution to the superresolved image based upon the position of the pair of transmitters within the array.

Embodiments of the present invention therefore provide for superresolution imaging with a resulting image that includes high-spatial frequency object information beyond the resolution limit of the receiving aperture. As the method and apparatus of embodiments of the present invention can operate remote from the target, the method and apparatus of embodiments of the present invention facilitate the superresolution imaging of a remote target, such as for remote sensing applications.

The features, functions, and advantages can be achieved independently in various embodiments of the present invention or may be combined in yet other embodiments.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is a diagram of the de-aliased portions of the object spectra formed from images collected by activating transmitter pairs in accordance with one embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
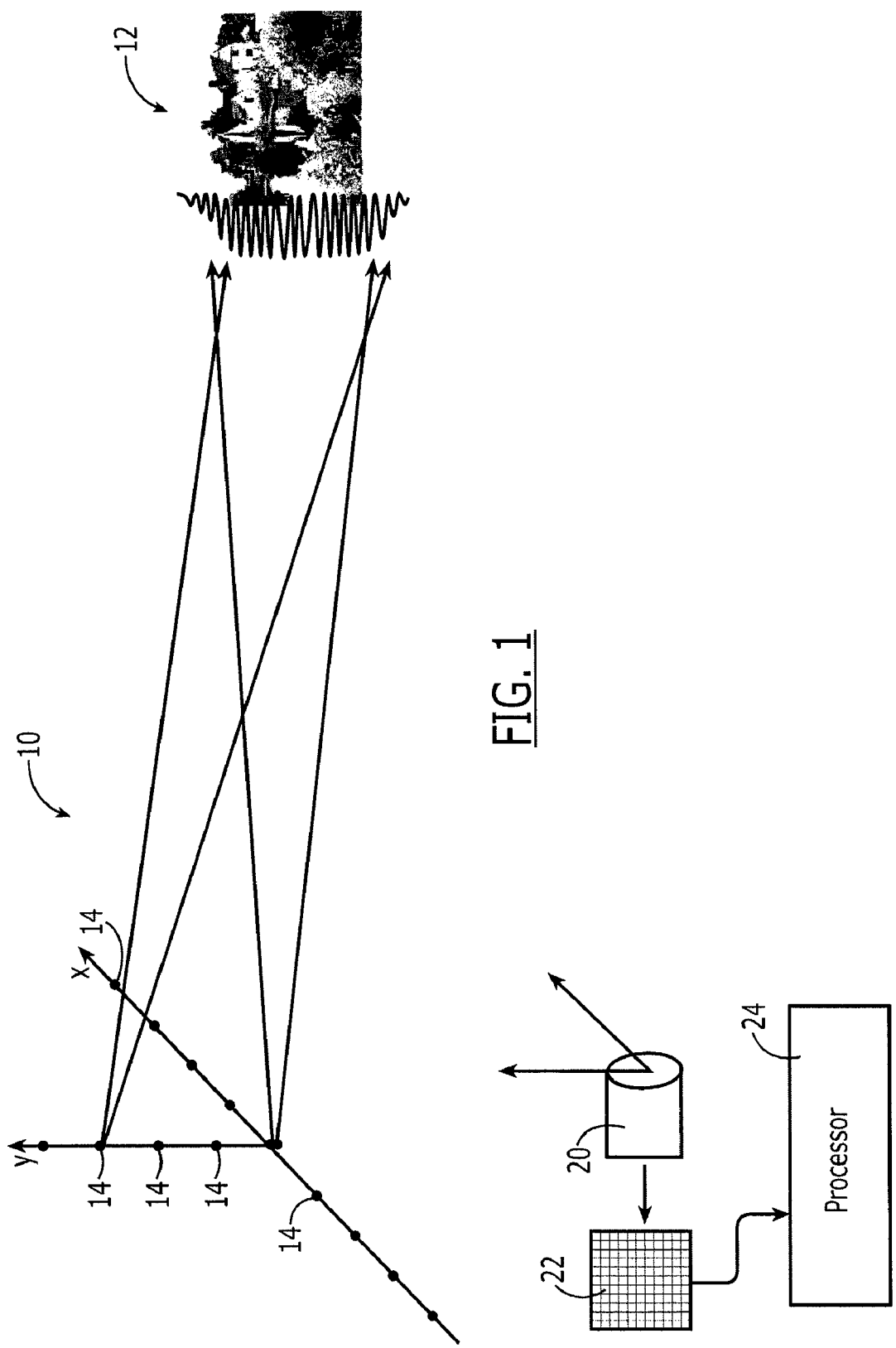
FIG. 1 is a schematic representation of an apparatus for superresolution imaging in accordance with one embodiment of the present invention.

Referring now to FIG. 1, an apparatus 10 for superresolution imaging of a target 12 includes a plurality of transmitters 14 spaced apart from one another, but configured to emit overlapping beams onto the target. Although the transmitters may be positioned in various manners, patterns and spacings, the transmitters of one embodiment may be carried by a relatively rigid support structure so as to be disposed in an array that extends in first and second orthogonal directions, such as the x and y directions depicted in FIG. 1. In the illustrated embodiment, the transmitters located along the x axis extend in both directions, that is, in both the positive and negative directions, relative to the origin O. Conversely, the transmitters that extend along the y axis extend only in one direction, that is, the positive direction from the origin. It is noted that the transmitters that extend along the y axis could also extend in the other direction, that is, in the negative direction relative to the origin, either instead of extending in the positive direction or in addition to extending in the positive direction. If the transmitters along the y axis extend in both the positive and negative direction relative to the origin, however, duplicative information would be obtained and, as a result, the apparatus of the illustrated embodiment includes only those transmitters spaced along the positive y axis.

Figure 2:
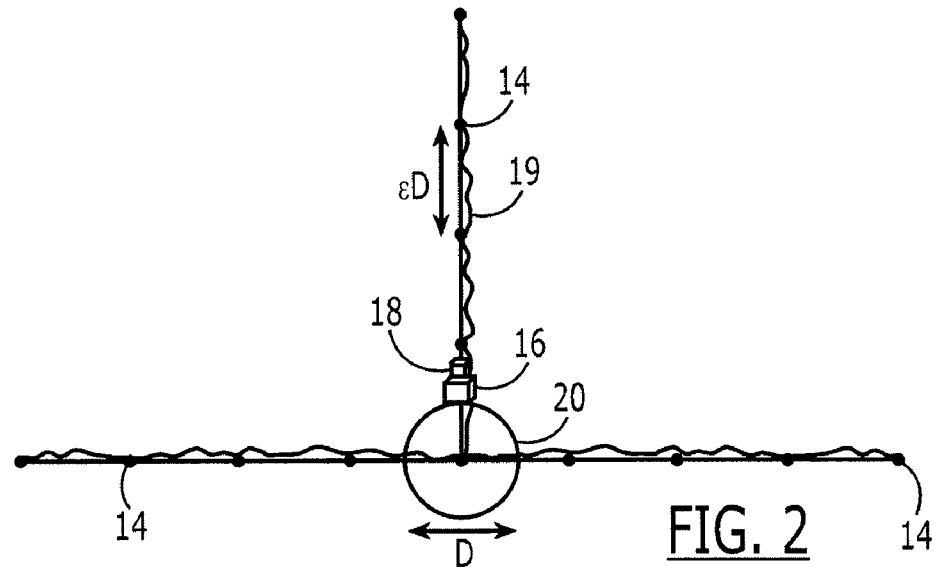
FIG. 2 is another schematic representation of an apparatus for superresolution imaging in accordance with one embodiment of the present invention.

As shown in FIG. 1, the transmitters 14 may be spaced from one another in each of the first and second directions by an equal spacing. However, in other embodiments, the spacing between different pairs of adjacent transmitters can differ. As the processing of the resulting image is somewhat simplified in instances in which the transmitters are evenly spaced, embodiments in which the transmitters are evenly spaced will be hereinafter discussed for purposes of illustration, but not of limitation. Each transmitter may comprise an optical source, such as a laser, for emitting an optical beam. However, as shown in FIG. 2, the apparatus 10 of one embodiment may include a common source 16 for providing optical signals to each of the transmitters. In this regard, the common source may be an optical source, such as a laser, that is optically connected to each of the transmitters by means of a respective optical fiber 19. In this embodiment, the transmitters may primarily serve as beam directors. In either instance, the emission aperture of the transmitters may be much smaller than the receiving aperture. Moreover, the transmitters need not include mirrors of a similar or greater size than the receiver. In any event, the transmitters are advantageously mutually optically coherent and spaced to collectively subtend a width greater, typically substantially greater than the receiving aperture. As described below, the phase of the signals emitted by the transmitters may be controlled and, as such, the apparatus may also include a phase modulator 18 positioned between the source and the transmitters.

In order to provide superresolution of M beyond that of a conventional image collected with a receiving aperture of diameter D, the transmitters 14 may extend outwardly from the origin O in each direction by a distance of (M D), e.g., the product of M and D. As such, the rectangular region subtended by the distance that the transmitters extend in the positive direction along the y axis and one of the positive or negative directions along the x axis forms the effective aperture area. The effective aperture area is, in turn, related to the resolution of the superresolved image.

As shown in FIG. 1, the apparatus 10 for superresolution imaging also includes a receiver 20 having a predefined receiving aperture for capturing an image of the target 12. In one embodiment, the receiver includes a telescope, such as an electro-optical imaging telescope, that defines the receiving aperture for receiving an image of the target. The receiver may also include a focal plane array 22 or other type of image capture device, e.g., an array of electro-optic detectors, for capturing the image received by the telescope. Although not illustrated, the receiver may also include a narrow band filter centered on the wavelength emitted by the transmitters 14 and positioned upstream of the telescope so as to reject other wavelengths.

The telescope may be positioned at various locations relative to the plurality of transmitters 14. In one embodiment, however, the telescope is proximate to, such as by being co-located with, the plurality of transmitters, such as shown in FIG. 2 in which the center of the receiving aperture of the telescope coincides with the origin O of the array of transmitters. As such, a support structure may be provided for appropriately positioning the telescope and for supporting the array of transmitters in the predefined locations relative to one another and relative to the telescope. In this regard, for example, the support structure may be T-shaped with first and second arms that extend outwardly from the origin along the x and y axes, respectively. Although the transmitters and receiver 20 may be proximate one another, the target 12 may be remote, that is, spaced at a distance much greater than the size of the telescope, such as in the case of ground-to-space imaging of satellites and orbital debris and air and space-based imaging of terrestrial objects.

In instances in which a target 12 is illuminated by the beam from a single transmitter 14, the image, termed the baseband image, captured by the receiver 20 can be expressed as follows:

$$I_O(x, y) = [O(x, y)B(x, y)] \otimes H(x, y)$$
$$= O_{SB}(x, y) \otimes H(x, y)$$

which in the Fourier domain is, $$\tilde{I}_O(f_x,f_y) = \tilde{O}_{SB}(f_x,f_y)\tilde{H}(f_x,f_y)$$

wherein
  ⊗ denotes convolution,
  $I_O(x, y)$ is the image generated by a single transmitter,
  $O(x, y)$ is the object,
  $B(x,y)$ is the illumination spot from a single transmitter,
  $H(x,y)$ is the point spread function of a conventional telescope, and
  $O_{SB}(x,y)$ is the object as illuminated by single beam,
  Wherein the addition of a tilde over a symbol is used to denote its Fourier transform, e.g. $\tilde{I}_O(f_x,f_y)$ is the Fourier transform of $I_O(x,y)$, and where $f_x$ and $f_y$ are Fourier spatial frequencies normalized by $f_{DL}=\lambda/D$ such that the circle $(f_x^2+f_x^2)=1$ corresponds to the Nyquist frequency associated with the diffraction limit cutoff of the optical transfer function (OTF) of the circular telescope receiver aperture (noting that other shapes such as rectangles, hexagons, etc. are possible in which case a different but similar normalization may be more convenient)

In accordance with embodiments of the present invention, a plurality of transmitters 14 are activated such that at least two transmitters emit signals concurrently so as to illuminate the target 12 with overlapping beams. The overlapping beams produce a fringe pattern that is modulated at spatial frequencies beyond the resolution limit of the receiving aperture. In this regard, the scale of the spatial variations corresponds to resulting diffraction limit on the image. From the array of transmitters, each unique pair of transmitters comprised of one transmitter along the x axis and one transmitter along the y axis may be separately activated and the image of the target that is created in response to the illumination by each respective pair of overlapping beams may be captured and processed. Although the actuation of the transmitters may be controlled in various manners, the apparatus 10 may include a processor 24 configured to control or direct the common source 16 and/or the transmitters 14 such that each pair of transmitters is sequentially activated. Additionally, the processor is configured to receive the image of the target that is captured by the receiver and to then process the image as described below.

In instances in which the target 12 is illuminated by a pair of overlapping beams, a spot pattern is produced that has the same envelope as that produced by a single beam, but with an additional multiplicative fringe pattern modulation term of $$\cos^2\left(\frac{mx+ny}{\lambda R/D}+\phi_{m,n}\right)$$

wherein m designates the transmitter along the x axis that is activated from among the 2K+1 transmitters located along the x axis with m being selected from among −K, . . . 0, . . . +K as shown in FIG. 1, n designates the transmitter along the y axis that is activated from among the K+1 transmitters located along the y axis with n being selected from among 0, 1 . . . K as shown in FIG. 1, D equals the diameter of the receiving aperture, R is _____ and $\phi_{m,n}$ corresponds to a translational shift of the fringe pattern associated with phase variations between the two transmitters (m,n) that are concurrently activated which can result from differences in their position along the line of sight to of the target and different phase delays that are attributable to differences in the fiber length. The Fourier transform of this additional multiplicative fringe pattern modulation term is three delta functions, one at DC and the other two at $$(f_x,f_y)=\pm(m\epsilon,n\epsilon)$$

wherein $\epsilon$ is the amount of superresolution M divided by the number of transmitters in one direction along the x and y axes, that is, K, i.e., $\epsilon=M/K$. For evenly spaced transmitters, it is also noted that the spacing between transmitters is equal to $\epsilon D$. Using the properties of Fourier transforms, the corresponding image as measured by the receiver 20 can therefore be expressed as:

$$\tilde{I}_{m,n}^{\theta}(f_x,f_y)=\tilde{H}(f_x,f_y)\left[\tilde{O}_{SB}(f_x,f_y)\otimes\begin{pmatrix}\delta(f_x,f_y)+\\.5e^{i\phi m,n+i\theta}\delta(f_x+m\epsilon,f_y+n\epsilon)+\\.5e^{i\phi m,n-i\theta}\delta(f_x-m\epsilon,f_y-n\epsilon)\end{pmatrix}\right]$$

$$=\tilde{H}(f_x,f_y)\left[\begin{pmatrix}\tilde{O}_{SB}(f_x,f_y)+\\.5e^{i\phi m,n+i\theta}\tilde{O}_{SB}(f_x+m\epsilon,f_y+n\epsilon)+\\.5e^{i\phi m,n-i\theta}\tilde{O}_{SB}(f_x-m\epsilon,f_y-n\epsilon)\end{pmatrix}\right]$$

wherein $\theta$ is the controlled phase shift introduced by the phase modulator 18 between the signals provided to and emitted by the respective transmitters 14 of a pair of concurrently activated transmitters.

In operation, for a particular pair of transmitters 14, the pair of transmitters would be activated to emit overlapping beams with no phase shift being introduced by the phase modulator 18. See operations 30 and 32 of FIG. 4. After capturing the image of the target produced by the overlapping beams having no phase difference introduced therebetween by the phase modulator, the same pair of transmitters would be activated with the phase modulator applying a 90° phase difference therebetween. See operations 34 and 36. The image of the target produced by the overlapping beams having a 90° phase difference introduced therebetween by the phase modulator is then captured. See operation 38. Although phase differences of 0° and 90° are discussed herein, other phase differences could be employed, such as −45° and 45°. Additionally, although the introduction of the phase difference may be controlled in various manners, the processor 24 of one embodiment may also control or direct the phase modulator to selectively introduce a phase difference. Either before or after the illumination of the target with the pair of transmitters as described above, a baseband image may also be captured in response to illumination of the target by a single transmitter. See operations 40 and 42. In this regard, the single transmitter may be any one of the transmitters including either one of the current pair of transmitters or a transmitter different than the current pair of transmitters. While a baseband image may be repeatedly captured in conjunction with the capture of images for each pair of transmitters as discussed above and shown in FIG. 4, the baseband image need not be captured with such regularity, particularly in instances in which the system is relatively stable with little pointing jitter. Instead, a single baseband image may be captured, such as either prior to or following the capture of images in response to illumination by pairs of transmitters, e.g., prior to operation 32 or following operation 46.

For a respective pair of transmitters 14 and as shown at operation 44 of FIG. 4, the images captured at these phase differences of 0° and 90° can be provided by the receiver 20 to the processor 24 which, in turn, is configured to combine the images and to subtract the baseband image $\tilde{I}_O(f_x,f_y)$ therefrom in order to isolate and recover the positive aliased term as follows:

$$\tilde{D}_{m,n}(f_x,f_y)=e^{-i\phi m,n}\left(\tilde{I}_{m,n}^{\theta=0}(f_x,f_y)-i\tilde{I}_{m,n}^{\theta=90}(f_x,f_y)-(1-i)\tilde{I}_O(f_x,f_y)\right)$$

$$=\tilde{H}(f_x,f_y)\tilde{O}_{SB}(f_x+m\epsilon,f_y+n\epsilon)$$

In the preceding expression, multiplication by $e^{-i\phi_{m,n}}$ serves to cancel the influence of relative shifts in the fringe pattern for different (m,n) combinations. A method for determining values for this term will be discussed later. The terms $\tilde{D}_{m,n}(f_x,f_y)$ will be referred to as aliasing orders (m,n) and will have valid data for spatial Fourier elements such that $(f_x,f_y)$ falls within the diffraction cutoff region, which for a circular aperture telescope is $(f_x^2+f_y^2)<1$. Note that as indicated earlier, fx and fy have been normalized by the diffraction cutoff of the OTF of the telescope receiver aperture such that for a circular aperture fx,fy=±1 correspond to a spatial frequency of magnitude $f_{DL}=\lambda/D$ cycles per radian where $\lambda$ is the wavelength of the light and D is the aperture diameter.

This process can then be repeated by the processor 24 for each pair of transmitters 14 so as to capture the baseband image (if desired) and the images generated in response to the phase modulator having introduced phase shifts of 0° and 90°. See operations 46, 48, 50 and 52 of FIG. 4. For each pair of transmitters and as shown in operations 44, 54 and 56, the processor is configured to determine the contribution to the resulting superresolved image attributable to the particular pair of transmitters (m, n) as represented by $\tilde{D}_{m,n}(f_x,f_y)$, shift the contribution based upon the relative location of the pair of transmitters within the array by shifting $\tilde{D}_{m,n}(f_x,f_y)$ by ±(m$\epsilon$, n$\epsilon$) to its positive and negative dealiased Fourier location (complex conjugating the negative displaced copy) and accumulate the results of each combination on a Fourier domain matrix to produce:

$$\tilde{T}(f_x,f_y)=\sum_{m=-K}^{K}\sum_{n=-K}^{K}\tilde{D}_{m,n}(f_x-m\epsilon,f_y-n\epsilon)$$

$$=\tilde{O}_{SB}(f_x,f_y)\sum_{m=-K}^{K}\sum_{n=-K}^{K}\tilde{H}(f_x-m\epsilon,f_y-n\epsilon)$$

Where terms with negative values of n are formed using the equality $\tilde{D}_{m,-n}(f_x,f_y)=\tilde{D}^*_{m,-n}(-f_x,-f_y)$ which follows from the symmetry properties of Fourier transforms of real valued functions.

Figure 3:
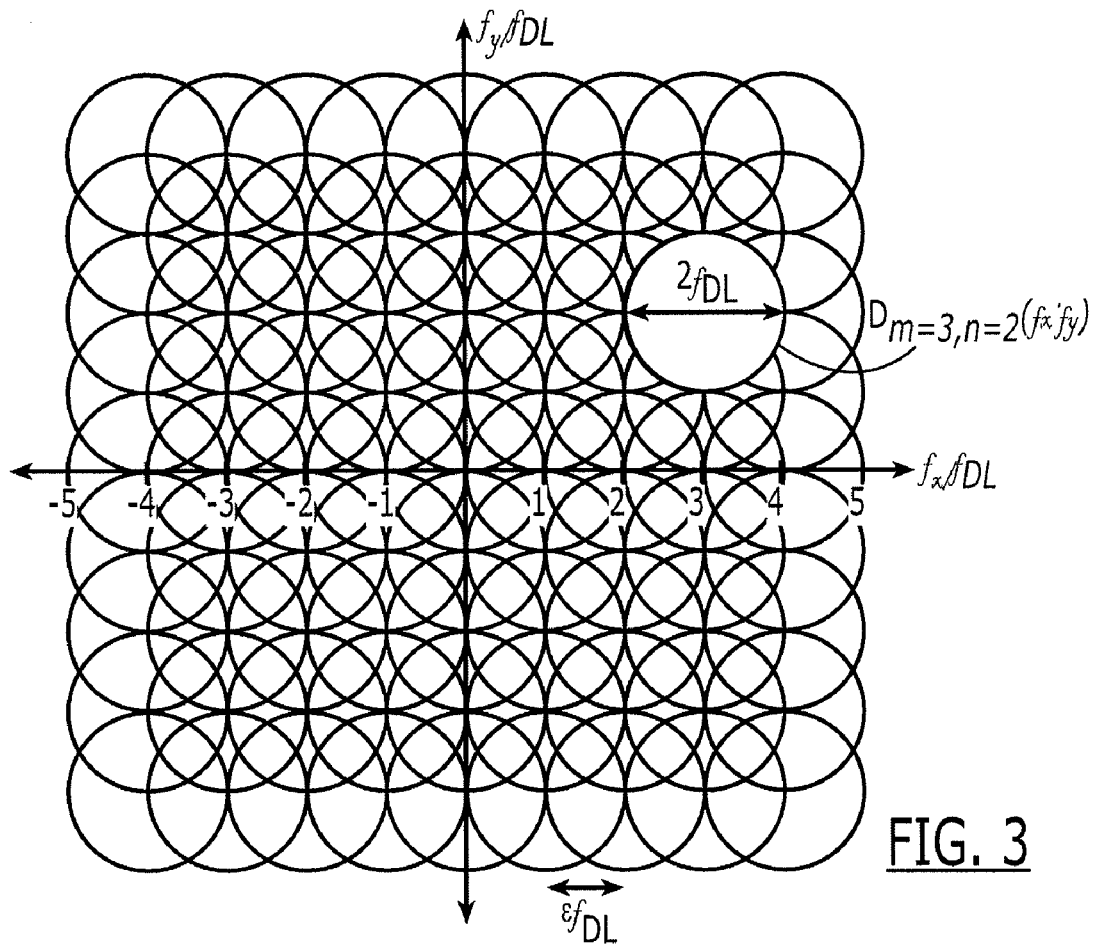
FIG. 3 is a graphical representation of a superresolved image produced in accordance with embodiments of the present invention.

With reference to FIG. 3, the contribution to the image of the target 12 that is provided by each pair of transmitters 14 is shown by a circle representing $\tilde{D}_{m,n}(f_x,f_y)$ that is appropriately positioned relative to the origin by shifting $\tilde{D}_{m,n}(f_x,f_y)$ by $\pm(m\epsilon,n\epsilon)$, that is, by a distance in the x and y directions that is associated with and defined by the relative locations of the respective pair of transmitters. For example, the circle highlighted in FIG. 3 is the contribution provided by the pair of transmitters designated m=3, n=2. By repeating this procedure for the contribution provided by each pair of transmitters and combining the resulting contributions, the composite image with high-spatial frequency target information can be produced by the processor 24 as reflected above in equation for $\tilde{T}(f_x,f_y)$ and as shown in FIG. 3.

Figure 4:
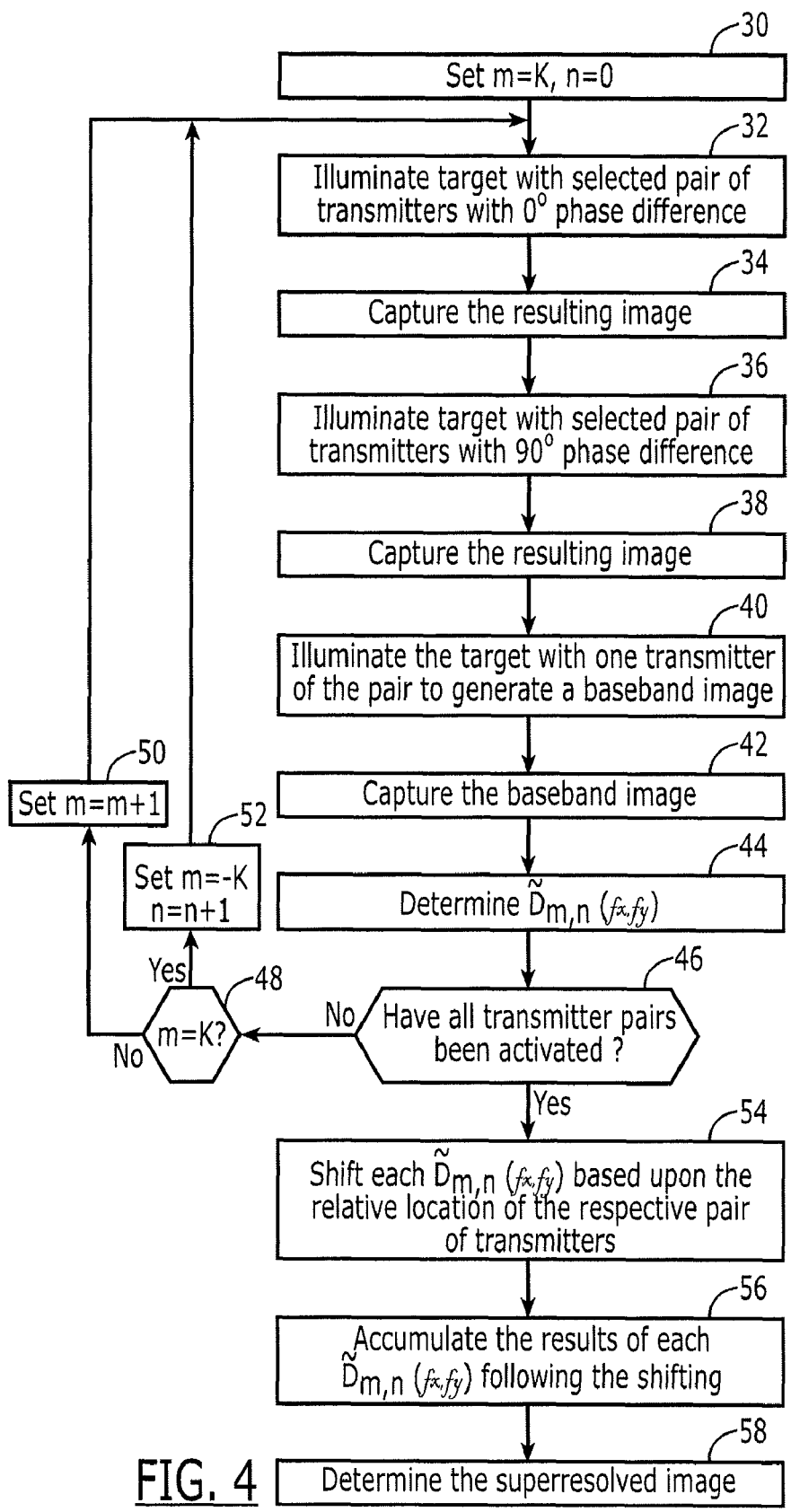
FIG. 4 is a flow chart of operations performed in accordance with a method of one embodiment of the present invention.

In order to obtain the superresolved image as shown in operation 58 of FIG. 4, the processor 24 is also configured to divide $\tilde{T}(f_x,f_y)$ by the effective active imaging OTF, namely, $$\sum_{m=-K}^{K}\sum_{n=-K}^{K}\tilde{H}(f_x-m\varepsilon, f_y-n\varepsilon),$$

so as to obtain $\tilde{O}_{SB}(f_x,f_y)$ which recovers the target's spectrum over a Fourier bandwidth of $(-M<f_x<M, -M<f_y<M)$. Relative to the foregoing, it is again noted that $f_x$ and $f_y$ are in units that have been normalized by $f_{DL}=\lambda/D$, e.g., the OTF cutoff associated with the telescope's diffraction limit. As will be noted, this spectrum is M times larger than that of the bandwidth of the conventional OTF $\tilde{H}(f_x,f_y)$ and, thus, corresponds to an M times resolution gain. By then taking the inverse Fourier transform of $\tilde{O}_{SB}(f_x,f_y)$, the processor determines the superresolved image of the target 12.

By illuminating the target 12 with a pattern modulated at spatial frequencies beyond the resolution limit of the receiving aperture, high-spatial frequency content of the target's spectrum beyond the passive OTF cutoff frequency of the receiving aperture may be down-shifted into its OTF passband. Embodiments of the present invention therefore provide for superresolution imaging with a resulting image that includes high-spatial frequency object information beyond the resolution limit of the receiving aperture. Moreover, as the method and apparatus of embodiments of the present invention can operate remote from the target, the method and apparatus of embodiments of the present invention facilitate the superresolution imaging of a remote target, such as for remote sensing applications.

Moreover, the processor 24 need not require a priori accurate knowledge of the spatial translation alignment of the projected sinusoidal fringe patterns. In addition to producing an image with resolution that is many times better than the diffraction limit, the method and apparatus of embodiments of the present invention may offer a number of other advantages including the avoidance of the FOV limits of Fourier telescopy since the number of resolution cells and FOV is not limited by the illumination transmitter spacing, the avoidance of strict requirements on long temporal coherence of OSAR techniques since the temporal coherence of the illumination need only be high enough to produce clear fringe patterns from interference between the beams projected by pairs of transmitters such that the laser can have a much smaller coherent time than for OSAR and can be semi-monochromatic, the use of broader band (non-monochromatic) laser sources which mitigates against laser speckle producing higher SNR images while also reducing laser speckle noise by generally averaging many images, the generation of a conventional type optical image unlike OSAR which produces a range-angle tomographic image, the reduction (relative to OSAR) in sensitivity to optical scale motion or deformation of the object (e.g., vibrations, wind blown foliage, etc.), and the provision of a second mode ability to produce a purely conventional passive diffraction limited image using just the receiver 20 without the source 16 and the transmitters 14. For example, embodiments of the present invention enable wide field-of-view moderate resolution covert surveillance in a passive manner without power needed for the illuminating transmitters, but permit the system to be switched into an active mode for high resolution narrow field-of-view imaging to zoom-in on targets or activity of high interest.

With reference to FIG. 3, as the spacing (defined as $\epsilon D$ for evenly spaced transmitters 14) between transmitters is increased with $\epsilon$ being increased toward $\sqrt{2}$, the tails of $\tilde{H}$ have less and less overlap, thereby creating larger dips in the OTF and making the reconstruction of the image of the target 12 more sensitive to noise. If $\epsilon$ is increased above $\sqrt{2}$, there will be gaps in the effective OTF where no object signal is recovered. In one embodiment intended to avoid gaps, $\epsilon$ is no greater than $\sqrt{2}$.

Although the plurality of transmitters 14 depicted in FIG. 1 only includes transmitters in one direction, i.e., the positive direction, along the y axis, the resulting image generated by the processor 24 can be reflected about the x axis in order to generate the image depicted in FIG. 3 since the portions of the image on opposite sides of the x axis are mirror images of one another. If desired, the array of transmitters may also include transmitters extending in the negative direction along the y axis.

As described above, the random phase variations $\phi$ were set to 0. In instances in which there are random phase variations and $\phi$ is not equal to 0, it is noted that each term $\tilde{D}_{m,n}$ in turn will have a strong overlap returns with adjacent $\tilde{D}_{m\pm1,n\pm1}$ terms. This overlap can be used to form a highly overdetermined and, thus, noise rebust system of equations that permit the determination of the relative phasor difference between $\phi_{m,n}$ and $\phi_{m',n'}$. Arbitrarily setting $\phi_{0,0}=0$, all other phasors can be recursively calculated.

In this regard, FIG. 5 shows two overlapping $\tilde{D}_{m,n}$ terms corresponding to de-aliased portions of the object spectra formed from images collected by activating transmitter pairs m,n and m',n'. The region S denotes the set of discrete domain Fourier components that fall within both $\tilde{D}_{m,n}$ and $\tilde{D}_{m',n'}$ which is expressed by $$S(m,n;m',n') = \begin{cases} f_x, f_y \in \tilde{D}_{m,n}(f_x-m\varepsilon, f_y-n\varepsilon) \\ \& \\ f_x, f_y \in \tilde{D}_{m,n}(f_x-m\varepsilon, f_y-n\varepsilon) \end{cases}$$

Corresponding elements of $\tilde{D}_{m,n}$ and $\tilde{D}_{m',n'}$ should equal each other allowing the set of equations to be formed $$\tilde{D}_{m,n}(f_x-m\epsilon,f_y-n\epsilon)=e^{-i(\phi_{m,n}-\phi_{m',n'})}\tilde{D}_{m',n'}(f_x-m'\epsilon,f_y-n'\epsilon)$$

$$\forall f_x,f_y \in S(m,n;m',n')$$

This can be solved by the processor 24 in a number of ways with the following equation being one exemplary solution which gives higher weight to elements with larger values.

$$\phi_{m,n} - \phi_{m',n'} =$$

$$\text{angle}\left\{\sum_{f_x,f_y \in (m,n;m',n')} \frac{\tilde{D}_{m',n'}(f_x - m'\varepsilon, f_y - n'\varepsilon)}{\tilde{D}_{m,n}(f_x - m\varepsilon, f_y - n\varepsilon)} \left|\tilde{D}_{m,n}\left(\begin{array}{c}f_x - m\varepsilon \\ f_y - n\varepsilon\end{array}\right)\right|^2\right\}$$

where angle { } indicates taking the phase angle of a complex quantity. Since only the phase differences are of importance, the value for $\phi_{0,0}$ can be set arbitrarily to zero. Then the other values can be solved for recursively by the processor. Since each $\tilde{D}_{m,n}$ term may overlap with several others, this provides additional constraints that can be taken advantage as well such as by forming a larger composite set of equations to be solved or by averaging over multiple different paths through the two dimensional spatial frequency $(f_x, f_y)$ plane connecting pairs of aliasing order terms $\tilde{D}_{m,n}$ and $\tilde{D}_{m',n'}$.

The number of Fourier elements $(f_x, f_y)$ of valid data within an aliased order $\tilde{D}_{m,n}(f_x, f_y)$ is a large fraction of the number of pixels falling with the illuminated target region 12 which for moderate sized images of even 100 by 100 pixels will number several thousand. Thus assuming transmitter spacings of 0.5D–D (e.g. 0.5<ε<1) the number of pixels in the regions S(m,n; m',n') of overlap between two adjacent aliasing orders, should also be at least several hundred elements if not thousands. As a result the estimates of the phase differences $\phi_{m,n} - \phi_{m',n'}$ will be very robust to noise due to the large amount of averaging that can be performed. Indeed, as noted above, the ability of embodiments of the present invention to be robust to phase fluctuation errors between the transmitters 14 is an advantage relative to Fourier Telescopy and OSAR techniques.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which claimed is:

1. An apparatus for superresolution imaging of a remote target, the apparatus comprising:
   a receiver having a predefined receiving aperture for capturing an image of the target;
   a plurality of transmitters spaced apart from one another and configured to concurrently emit signals directed toward the target with a phase difference therebetween, wherein the plurality of transmitters are further configured to emit overlapping beams onto the target such that interaction of the overlapping beams with the target produces a fringe pattern modulated at spatial frequencies beyond a resolution limit of the receiving aperture; and
   a processor configured to process the image including at least a portion of the fringe pattern in order to produce a superresolved image including spatial frequency content beyond the resolution limit of the receiving aperture.

2. An apparatus according to claim 1 wherein the plurality of transmitters are configured such that a first group of two or more transmitters concurrently emits signals at a first time and a second group of two or more transmitters, different than the first group, concurrently emits signals at a second time.

3. An apparatus according to claim 2 wherein the processor is configured to produce the superresolved image based upon the images created by each group of transmitters.

4. An apparatus according to claim 3 wherein, for each group of transmitters, the processor is configured to determine a contribution to the superresolved image based upon the image created by the respective group of transmitters and to determine a location of the contribution to the superresolved image based upon a position of the transmitters which comprise the respective group.

5. An apparatus according to claim 1 wherein the receiver and the plurality of transmitters are proximate one another and remote from the target.

6. An apparatus according to claim 1 further comprising a common source for providing signals to said plurality of transmitters.

7. A method for superresolution imaging of a remote target, the method comprising:
   concurrently emitting signals directed toward the target from a plurality of transmitters spaced apart from one another, wherein concurrently emitting signals comprises concurrently emitting signals from different transmitters that have a phase difference therebetween, and wherein concurrently emitting signals comprises emitting overlapping beams onto the target such that interaction of the overlapping beams with the target produces a fringe pattern modulated at spatial frequencies beyond a resolution limit of a receiving aperture;
   capturing an image of the target with a receiver have a predefined receiving aperture; and
   processing the image including at least a portion of the fringe pattern in order to produce a superresolved image including spatial frequency content beyond the resolution limit of the receiving aperture.

8. A method according to claim 7 wherein concurrently emitting signals comprises concurrently emitting signals at a first time with a first group of two or more transmitters and concurrently emitting signals at a second time with a second group of two or more transmitters, different than the first group.

9. A method according to claim 8 wherein processing the image comprises producing the superresolved image based upon the images created by each group of transmitters.

10. A method according to claim 9 wherein, for each group of transmitters, processing the image comprises determining a contribution to the superresolved image based upon the image created by the respective group of transmitters and determining a location of the contribution to the superresolved image based upon a position of the transmitters which comprise the respective group.

11. A method according to claim 7 further providing signals to the plurality of transmitters from a common source.

12. An apparatus for superresolution imaging of a remote target, the apparatus comprising:
   a telescope having a predefined receiving aperture for capturing an image of the target;
   an array of transmitters spaced apart from one another in first and second orthogonal directions, wherein different pairs of transmitters are configured to emit signals directed toward the target with a phase difference therebetween such that interaction of the overlapping beams with the target produces a fringe pattern upon the target that is modulated at spatial frequencies beyond a resolution limit of the receiving aperture; and a processor configured to process the images including at least a portion of the fringe patterns created by different pairs of transmitters in order to produce a superresolved image including spatial frequency content beyond the resolution limit of the receiving aperture.

13. An apparatus according to claim 12 wherein at least some of the transmitters are spaced such that adjacent transmitters are spaced apart by no more than $\sqrt{2}$.

14. An apparatus according to claim 12 wherein the array of transmitters comprises a first plurality of transmitters extending in the first direction and a second plurality of transmitters extending in the second direction.

15. An apparatus according to claim 12 further comprising a common source for providing signals to said plurality of transmitters.

16. An apparatus according to claim 15 wherein the common source has a coherence length that is at least as great as the greater of the widths of the array of transmitters in the first and second directions.

17. An apparatus according to claim 15 further comprising a phase shifter for introducing a predefined phase shift to the signals provided by the common source to a pair of transmitters.

18. An apparatus according to claim 12 wherein the array of transmitters is configured such that a first pair of transmitters concurrently emits signals at a first time and a second pair of transmitters, different than the first pair, concurrently emits signals at a second time.

19. An apparatus according to claim 18 wherein the processor is configured to produce the superresolved image based upon the images created by each pair of transmitters.

20. An apparatus according to claim 19 wherein, for each pair of transmitters, the processor is configured to determine a contribution to the superresolved image based upon the image created by the respective pair of transmitters and to determine a location of the contribution to the superresolved image based upon a position of the pair of transmitters within the array.

* * * * *